United States Patent
Obaidi

(10) Patent No.: US 10,338,609 B2
(45) Date of Patent: Jul. 2, 2019

(54) AUTHORIZING DRONE ACCESS TO FULFILLMENT CENTERS

(71) Applicant: T-Mobile U.S.A., Inc., Bellevue, WA (US)

(72) Inventor: Ahmad Arash Obaidi, Mercer Island, WA (US)

(73) Assignee: T-Mobile USA, Inc., Bellevue, WA (US)

(*) Notice: Subject to any disclaimer, the term of this patent is extended or adjusted under 35 U.S.C. 154(b) by 26 days.

(21) Appl. No.: 15/476,834

(22) Filed: Mar. 31, 2017

(65) Prior Publication Data

US 2018/0281946 A1    Oct. 4, 2018

(51) Int. Cl.
*G05D 1/10* (2006.01)
*G08G 5/00* (2006.01)
*H04B 7/185* (2006.01)
*G08G 5/04* (2006.01)

(52) U.S. Cl.
CPC .......... *G05D 1/104* (2013.01); *G08G 5/0017* (2013.01); *G08G 5/0043* (2013.01); *G08G 5/045* (2013.01); *H04B 7/18506* (2013.01); *B64C 2201/14* (2013.01)

(58) Field of Classification Search
CPC .............................. B64C 39/024; G05D 1/104
See application file for complete search history.

(56) References Cited

U.S. PATENT DOCUMENTS

| | | | |
|---|---|---|---|
| 9,305,280 B1 * | 4/2016 | Berg | G08G 5/0069 |
| 9,412,278 B1 | 8/2016 | Gong et al. | |
| 9,764,836 B1 * | 9/2017 | Elzinga | B64C 39/024 |
| 9,777,502 B2 * | 10/2017 | Curlander | E04H 14/00 |
| 9,950,791 B2 * | 4/2018 | Blomberg | B64F 1/368 |
| 10,013,886 B2 * | 7/2018 | Blomberg | G08G 5/0013 |
| 2016/0253907 A1 | 9/2016 | Taveira | |

FOREIGN PATENT DOCUMENTS

| | | |
|---|---|---|
| JP | 2017037368 A | 2/2017 |
| WO | 2017013417 A1 | 1/2017 |

OTHER PUBLICATIONS

International Searching Authority, International Search Report and Written Opinion, PCT Patent Application PCT/US2018/025563, dated Jul. 26, 2018, 10 pages.

* cited by examiner

*Primary Examiner* — Hussein Elchanti
*Assistant Examiner* — Michael A Berns
(74) *Attorney, Agent, or Firm* — Perkins Coie LLP

(57) ABSTRACT

Systems and methods for authorizing drones with access to airborne fulfillment centers (AFCs) and other warehouse facilities are described. For example, the systems and methods perform multiple authentication processes, including a physical authentication process and a virtual or electronic authentication process, when determining whether a drone is authorized to access an AFC. Once authorized, the drone may access the AFC to pick up and/or deliver packages or other products, to recharge, to seek repairs, to be housed, and so on.

16 Claims, 5 Drawing Sheets ically located fulfillment centers may be vulnerable to attacks by malicious actors, such as attacks from drones attempting to infiltrate the AFCs to steal products or otherwise disrupt the operations or functionality of the AFCs and/or their systems.

These and other problems exist with respect to deploying AFCs as central hubs of products to be delivered to customers.

BRIEF DESCRIPTION OF THE DRAWINGS

Embodiments of the present technology will be described and explained through the use of the accompanying drawings.

Figure 1:
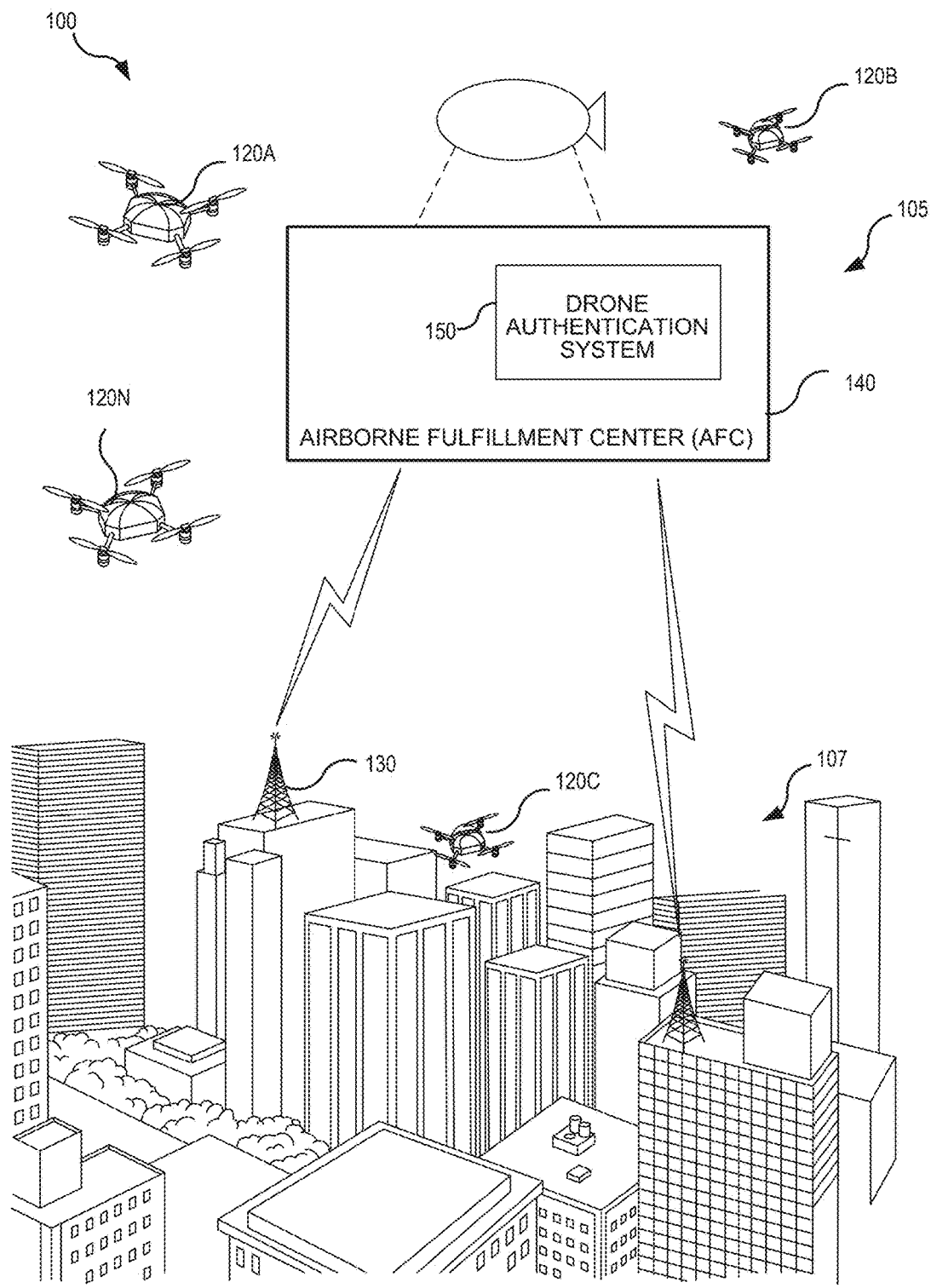
FIG. 1 is a diagram illustrating a suitable network environment.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Overview

Systems and methods for authorizing drones with access to airborne fulfillment centers (AFCs) and other warehouse facilities are described. For example, the systems and methods perform multiple authentication processes, including a physical authentication process and a virtual or electronic authentication process, when determining whether a drone is authorized to access an AFC. Once authorized, the drone may access the AFC to pick up and/or deliver packages or other products, to recharge, to seek repairs, to be housed, and so on.

In some embodiments, the systems and methods provide a drone with access to the airborne fulfillment center by receiving a request for access to the airborne fulfillment center by a drone located within a geographical region that includes the airborne fulfillment center, and sending a request to the drone for virtual access credentials associated with the drone. Upon receiving the virtual access credentials from the drone, the systems and methods determine whether the virtual access credentials match virtual access credentials stored in a database of the authorization system, and when the virtual access credentials match access credentials stored in the database of the authorization system, send a request to the drone to provide physical access credentials.

The systems and methods determine whether the physical access credentials match a physical access verification device associated with the authorization system (e.g., a certain configuration of a probe of the drone couples to the verification device), and when the physical access credentials match the physical access verification device, the systems and methods authorize the drone with access to the airborne fulfillment center.

In some embodiments, when the virtual access credentials and/or physical access credentials do not match access credentials stored in the database of the authorization system, the systems and methods may initiate a protection mechanism to protect the airborne fulfillment center from a possible cyberattack or physical attack originating from the drone.

Thus, in some embodiments, the systems and methods authorize a drone with access to a facility, such as an AFC, by performing a first authentication process that identifies a drone based on virtual credentials provided by the drone, performing a second authentication process that identifies the drone based on physical credentials provided by the drone, and determining the drone is authorized to the access the facility based on the identification of the drone via the virtual credentials and the physical credentials provided by the drone.

By performing a multi-stage authentication process, which, in some cases, includes physical and virtual authentication mechanisms, the systems and methods may provide AFCs and other fulfillment centers or product warehouses with enhanced levels of security and protection, among other benefits.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to delivery drones, embodiments of the present technology are equally applicable to customized scheduling and management of drones and other autonomous vehicles for any purpose (e.g., autonomous cabs). In addition, the types of drones utilized by some embodiments are not limited to aerial vehicles but instead relate to any vehicle capable of air, sea, or land based transit. For example, delivery drones may include water-based drones that ride on top of or under water.

The techniques introduced here can be embodied as special-purpose hardware (e.g., circuitry), as programmable circuitry appropriately programmed with software and/or firmware, or as a combination of special-purpose and programmable circuitry. Hence, embodiments may include a non-transitory computer- and/or machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

Examples of a Suitable Network Environment

As described herein, although airborne fulfillment centers (and other floating or airborne vehicles, such as other drones, satellites, and so on) provide an efficient and localized mechanism for facilitating the delivery of products to customers within a certain geographical location via delivery drones, they may be vulnerable to attacks by other airborne vehicles, such as drones posing or representing themselves as delivery drones associated with a certain AFC or company. For example, an unknown drone may attempt to access the AFC, or travel to a close proximity of the AFC), to steal goods from the AFC, cause physical harm to the AFC, cause electronic harm (e.g., signaling harm) to the AFC, disrupt the orbit or flight path of the AFC, or perform other nefarious attacks or actions.

Therefore, an AFC, in order to protect itself and the various products, commercial merchandise/goods, and/or data contained by the AFC, may interrogate approaching drones, such as drones requesting access to the AFC, in order to verify the approaching drones are authorized and/or known to the AFC.

FIG. 1 is a diagram illustrating a suitable network environment 100 that facilitates communications between various drones 120A-N and an airborne fulfillment center 140. As illustrated in FIG. 1, the network environment 100 shows a geographical region (e.g., a city or metro area) that includes a ground-level area 107 (e.g., buildings, roads, houses, and so on), and an area above the ground 105 that has multiple delivery drones 120A-120N (e.g., such as a quadcopter or other autonomous aircraft). For example, the delivery drones 120A-120N includes a drone 120A approaching or proximate to the AFC 140, a drone 120B at a distance from the AFC 140 (e.g., not approaching or not proximate to the AFC 140), a drone 120C on a delivery to one of the buildings within the ground-level area 107, and other drones 120N.

The AFC 140, the drones 120A-N, and other network components may communicate with one another over a communications network 130. In accordance with various embodiments, delivery drones 120A-120N may include network communication components that enable the delivery drones to communicate with the AFC 140, such as with servers within the AFC 140 and/or remote from the AFC 140, including a drone authentication system 150, to be described herein, and/or other portable electronic devices (not shown) by transmitting and receiving wireless signals using licensed, semi-licensed or unlicensed spectra over communications network 130.

In some cases, communication network 130 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network 130 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EG-PRS)), Enhanced Data rates for GSM Evolution (EDGE), Universal Mobile Telecommunications System (UMTS), or Long Term Evolution (LTE) network), or other communications network. In some cases, the drones 120A-120N may directly communicate with the AFC via various peer-to-peer communication protocols, such as Bluetooth™.

Those skilled in the art will appreciate that various other components (not shown) may be included in delivery drones 120A-120N to enable network communication. For example, a delivery drone may be configured to communicate over a GSM or newer mobile telecommunications network. As a result, the delivery drone 120A-120N may include a Subscriber Identity Module (SIM) card that stores an International Mobile Subscriber Identity (IMSI) number that is used to identify the delivery drones 120A-120N on the GSM mobile or other communications networks, for example, those employing 3G and/or 4G wireless protocols. One advantage of this type of configuration is that the delivery drone can be equipped with one or more cellular radios to permit direct communication with users, e.g. sending a text when the drone approaches a departure or arrival location. If delivery drone 120A-120N is configured to communicate over another communications network, the delivery drone 120A-120N may include other components that enable it to be identified on the other communications networks.

In some embodiments, delivery drones 120A-120N may include components that enable them to connect to a communications network using Generic Access Network (GAN), Unlicensed Mobile Access (UMA), or LTE-U standards and protocols. For example, delivery drones 120A-120N may include components that support Internet Protocol (IP)-based communication over a Wireless Local Area Network (WLAN) and components that enable communication with the telecommunications network over the IP-based WLAN. Further, while not shown, the delivery drones 120A-120N may include capabilities for permitting communications with satellites. check-in with drone management engine 140 and/or remote servers 150A-150N.

The AFC 140 may include or be associated with various servers that collect and manage a variety of information. For example, the servers, which may be part of the AFC 140 or located remotely from the AFC 140, may include an availability server, a registration server, and a location server. The AFC 140 may query the availability server to determine which delivery drones 120A-120N are available for completing a delivery within a specified time window. The results of the query may then be used by the AFC 140 for the coordination and scheduling of a package pick-up and delivery. For example, the AFC 140 may select drones based on location, timing availability, maximum speed, range, cargo capabilities (e.g., size, weight, etc.), cost of operation, and/or other factors (e.g., weather conditions, landing areas, etc.).

The registration may be configured to register users (e.g., via a graphical user interface) of the delivery system. Once a user is registered, the user may then access the system to schedule customized deliveries. The location server may be used to store the current and past locations of each delivery drone 120A-120N within the drone delivery fleet. While not illustrated, the system may connect to other servers for items such as, but not limited to, weather forecasts, geographical reports, flight restrictions, etc., and thereby actively modify drone availability, drone routes, and so on, based on data from these other servers. In accordance with some embodiments, the delivery drones can be operated automatically using a GPS navigation system that's built on-board to provide updated navigation route. The GPS system can calculate the optimum route or routes that are preprogrammed between major cities/destinations. The GPS system and other components of the delivery drones could also be updated remotely using Firmware-Over-The-Air.

While not illustrated in FIG. 1, some embodiments allow for the delivery system to be an integral part of a marketplace as part of a value added service. In accordance with some embodiments, a user buying or selling an item may select drone-based delivery. Once a transaction is completed, the marketplace may interface with the delivery system to automatically schedule a pick-up and drop-off with the seller and buyer.

Further details regarding the delivery system and the coordination of the drones 120A-120N with respect to the AFC 140 for deliveries and other operations are described in commonly-assigned U.S. patent application Ser. No. 14/869, 922, filed on Sep. 29, 2015, entitled DRONE-BASED PERSONAL DELIVERY SYSTEM, which is hereby incorporated by reference in its entirety.

As described herein, the AFC 140 may include, or be associated with (e.g., at a remote server) the drone authentication system 150, which includes components or modules configured to interrogate approaching drones (e.g., drone 120A) to the AFC 140. For example, in order to authorize the drone 120A to access or travel to a certain proximity to the AFC 140, the system 150, as described herein, may perform a first authentication process that identifies a drone based on virtual credentials provided by the drone, and perform a second authentication process that identifies the drone based on physical credentials provided by the drone. Further details regarding the authentication processes performed and/or facilitated by the drone authentication system 150 will be described herein.

FIG. 1 and the discussion herein provide a brief, general description of the suitable computing environment 100 in which the systems and methods can be supported and implemented. Although not required, aspects of the systems and methods are described in the general context of computer-executable instructions, such as routines executed by a general-purpose computer, e.g., mobile device, a server computer, or personal computer. Those skilled in the relevant art will appreciate that the system can be practiced with other communications, data processing, or computer system configurations, including: Internet appliances, handheld devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hardwired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

In some cases, the communication network 130 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. As described herein, the communications network may also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), Long Term Evolution (LTE) network), Voice over LTE (VoLTE), IMS network, or other communications network.

Examples of Authorizing Drones to Access an AFC

As described herein, an airborne fulfillment center, or AFC, in some embodiments, includes a drone authentication system 150 configured to identify and/or authorize access to the AFC 140 for the drones 120A-120N that may approach the AFC 140.

Figure 2A:
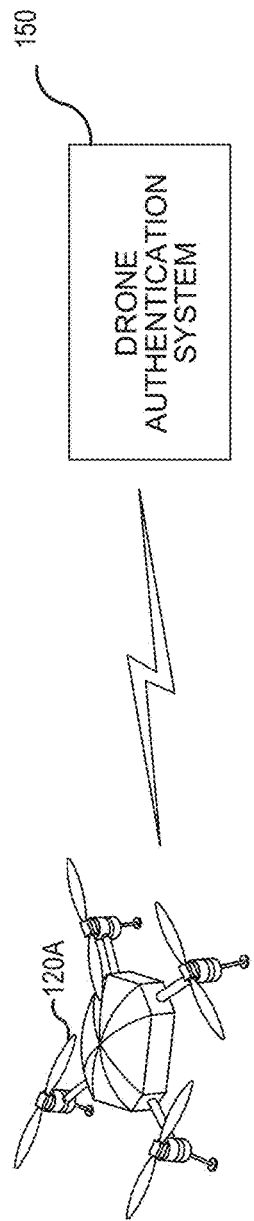
FIGS. 2A-2B are diagrams illustrating the authentication of a drone to an airborne fulfillment center.
Figure 2B:
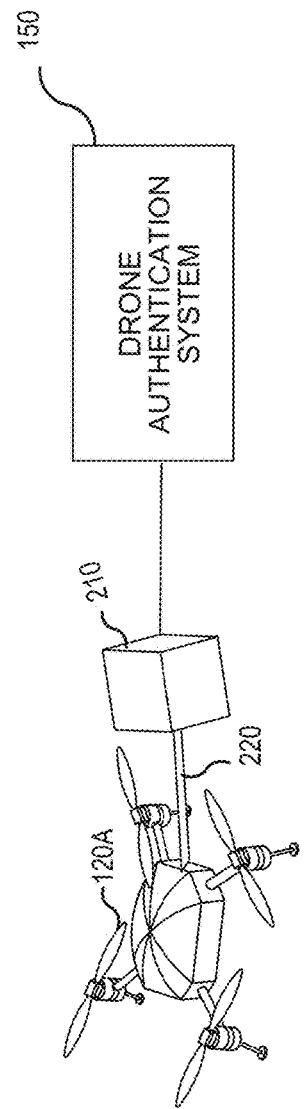

FIGS. 2A-2B are diagrams illustrating the authentication of a drone to an airborne fulfillment center. FIG. 2A depicts a first authentication process or mechanism, where the drone 120A communicates virtual credentials to the drone authentication system 150 over the communications network 130. The virtual credentials may be, for example, a username and password, an identifier for the drone, one or more visual indicators associated with the drone, an encryption key, and so on.

FIG. 2B depicts a second authentication process or mechanism, where the drone 120A provides physical credentials to the drone authentication system 150. As shown, the drone may include a probe 220, which presents one or more configurable physical keys or components that are configured to couple to a physical access verification device 210 of the drone authentication system 150.

For example, the probe 220 may be configured to provide a variable set of pins or other protrusions, in effect acting as a configurable "key," which may couple to a "lock" or other reception or input component of the verification device 210. FIGS. 3A-3D are diagrams illustrating various example physical credentials provided by a drone during a physical authentication process.

Figure 3A:
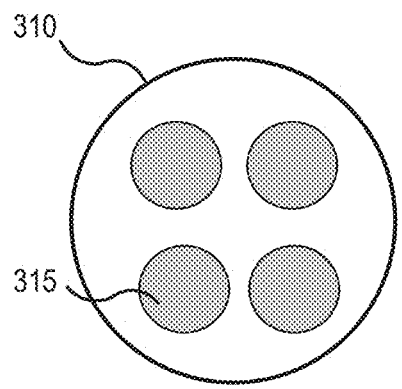
FIGS. 3A-3D are diagrams illustrating various example physical credentials configurations provided by a drone during a physical authentication process.
Figure 3B:
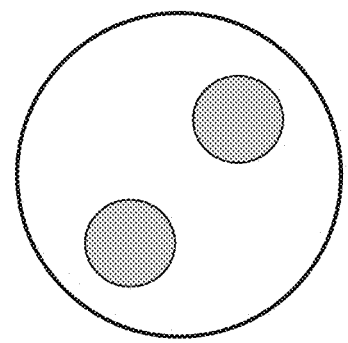
Figure 3C:
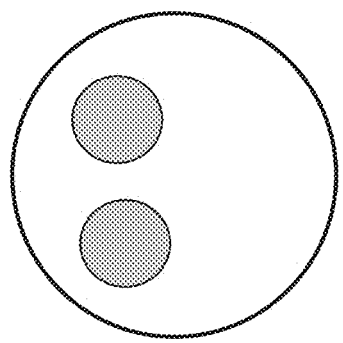
Figure 3D:
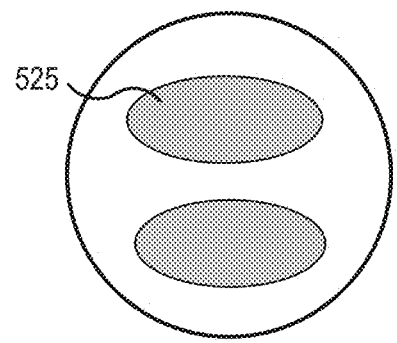

As shown, the configuration of one or more pins 315 extending from a face 310 or other surface of the probe 220 may vary. Each different configuration (e.g., 4 pins as shown in FIG. 3A, two diagonal pins as shown in FIG. 3B, two vertical pins as shown in FIG. 3C, two larger pins as shown in FIG. 3D, and so on), may represent the identification of the drone 120A, and be dynamically generated and/or configured, such as in response to a request from the system 150 after the virtual credentials of the drone are initially authenticated by the system 150.

Of course, the configuration of the pins 315, the shape of the pins 315, and/or the geometry of the face 310 may vary based on the application or as requested by the system 150, in order to ensure the probe 220 acts as a key or other physical verification device for the drone 120A.

Therefore, in some embodiments, the system 150 may generate and send a set of physical access credentials to the drone 120A after receiving the virtual access credentials from the drone 120A. The drone 120A, in response, provides a certain configuration (e.g., as shown in FIG. 3C) of the face 310 of the probe 210, and physically couples the probe 220 to the verification device 210, for authorization to the AFC 140.

Thus, the system 150 may authorize a drone with access to the AFC 140 after a suitable or actual occurrence of a form fits function coupling between the probe 220 of the drone 120A and an input component of the physical access verification device 210.

Of course, the system 150 may utilize other physical verification or coupling devices or components during the physical authentication process shown in FIG. 2B. For example, the system 150, via the device 210, may capture (e.g., take an image) of information (e.g., icons, identifiers, and so on) displayed by the drone 120, may request other types of probes, keys, and/or coupling components to physically couple with the verification device 210, and so on.

Figure 4:
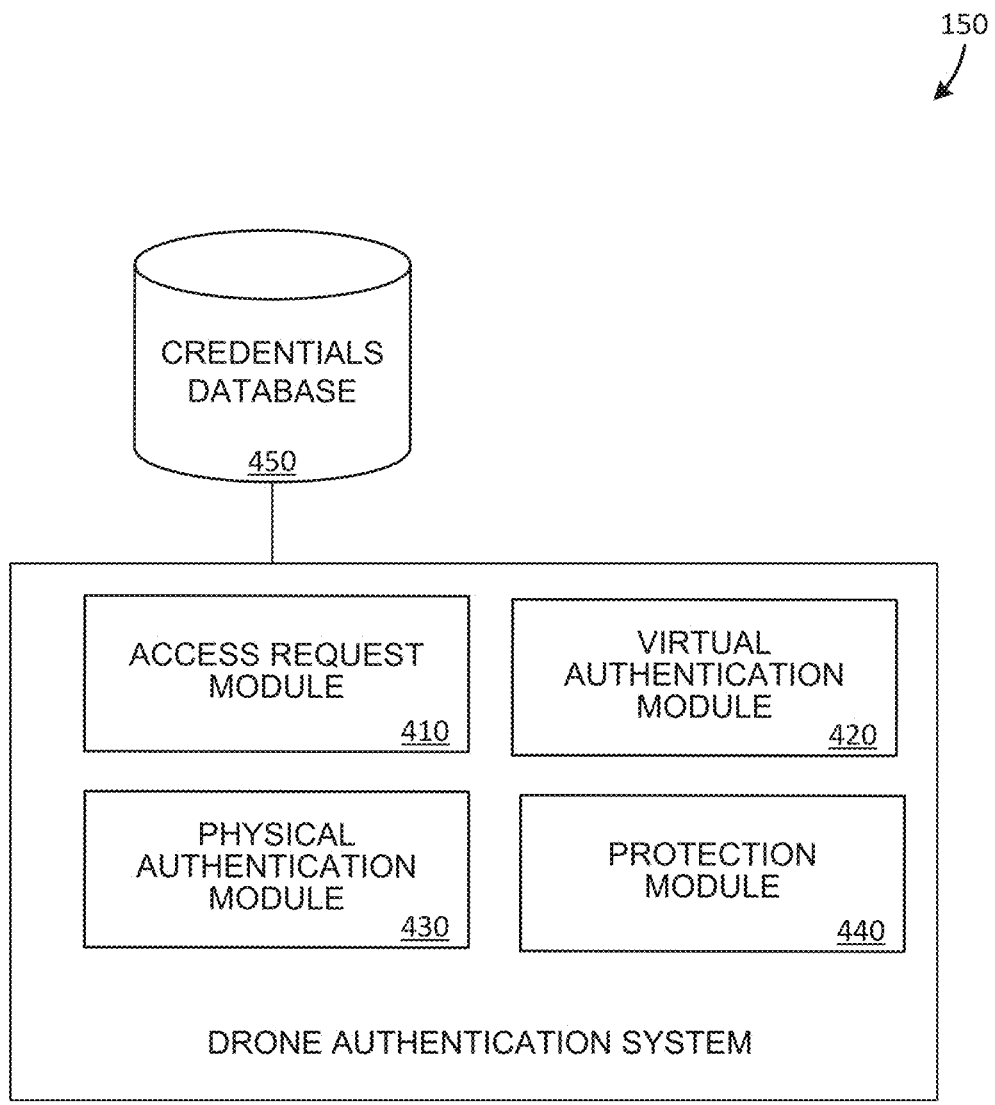
FIG. 4 is a block diagram illustrating components of a drone authentication system.

As described herein, the system, using the multi-stage authentication processes described herein, facilitates, manages, and/or controls access to the AFC 140 for various approaching drones 120A-120 FIG. 4 is a block diagram illustrating components of the drone authentication system 150. The drone authentication system 150 may include functional modules or systems that are implemented with a combination of software (e.g., executable instructions, or computer code) and hardware (e.g., at least a memory and processor). Accordingly, as used herein, in some examples a module or system is a processor-implemented module, system, or set of code and represents a computing device having a processor that is at least temporarily configured and/or programmed by executable instructions stored in memory to perform one or more of the particular functions that are described herein. For example, the system 150 includes an access request module 410, a virtual authentication module 420, a physical authentication module 430, and a protection module 440.

In some embodiments, the access request module 410 is configured and/or programmed to receive a request for access to a product fulfillment center, such as the AFC 140, by a drone located at a geographical region that includes the product fulfillment center.

In some embodiments, the virtual authentication module 420 is configured and/or programmed to send a request to the drone for virtual access credentials associated with the drone, and upon receiving the virtual access credentials from the drone, determine whether the virtual access credentials match virtual access credentials stored in a database of the authorization system.

For example, the virtual authentication module 420 may store or be associated with a credentials database 450 that stores, via various data structures, information identifying drones 120A-120N authorized to access one or more areas of the product fulfillment center. Table 1 present as example (e.g., albeit simplified) data structure contained in the credentials database 450:

TABLE 1

| Drone ID | Authentication | Authorized Areas |
|---|---|---|
| Drone12345 | Virtual and physical | Warehouse1, repair |
| Drone34444 | Virtual and physical | Repair, recharge |
| Drone88987 | Virtual | Warehouse1, warehouse2 |

As shown in the table, the data structure may include various entries that relate drone identifiers to authentication levels to authorized areas, among other information.

In some embodiments, the physical authentication module 430 is configured and or programmed to, when the virtual access credentials match access credentials stored in the database 350 of the authorization system 150, send a request to the drone to provide physical access credentials, determine whether the physical access credentials match the physical access verification device 210 associated with the authorization system, and when the physical access credentials match the physical access verification device, authorize the drone with access to the product fulfillment center (e.g., AFC).

For example, the physical authentication module 430 may determine that a certain configuration of pins extending from the probe 220 of the drone is coupled to an input component of the physical access verification device 210 and/or otherwise determine an occurrence of a form fits function coupling between the probe 220 of the drone and the input component of the physical access verification device 210.

In some cases, as described herein, the drone 120A may only be authorized to access one or more specific areas of the AFC 140. For example, the module 430 may authorize access to a product delivery area of the product fulfillment center (e.g., to pick up or drop off packages or other items to be delivered), to a drone repair area of the product fulfillment center (e.g., to receive repairs, such as battery replacements, rotor replacements, general maintenance, and so on), to a drone recharging area of the product fulfillment center (e.g., to recharge the battery of the drone), and so on.

In some embodiments, the protection module 440 is configured and programmed to, when the virtual access credentials and/or physical access credentials do not match access credentials or expected coupling, initiate a protection mechanism to protect the product fulfillment center from a possible cyberattack or physical attack originating from the drone.

For example, the protection module 440 may initiate an operation to jam one or more signals of the drone, prevent communications between the drone and the product fulfillment center, or otherwise disrupt the communication capabilities of the drone. As another example, the protection module 440 may initiate an operation to physically attack the drone, to move the drone away from the product fulfillment center.

Therefore, in some cases, the protection module 440 may initiate processes or operations to warn unknown or unauthorized drones from moving towards the AFC 140 and/or attempting to access the AFC 140, and may continue the processes or operations to provide a virtual security cocoon for the AFC 140, where side-channel attacks are mitigated or prevented, among other benefits.

Figure 5:
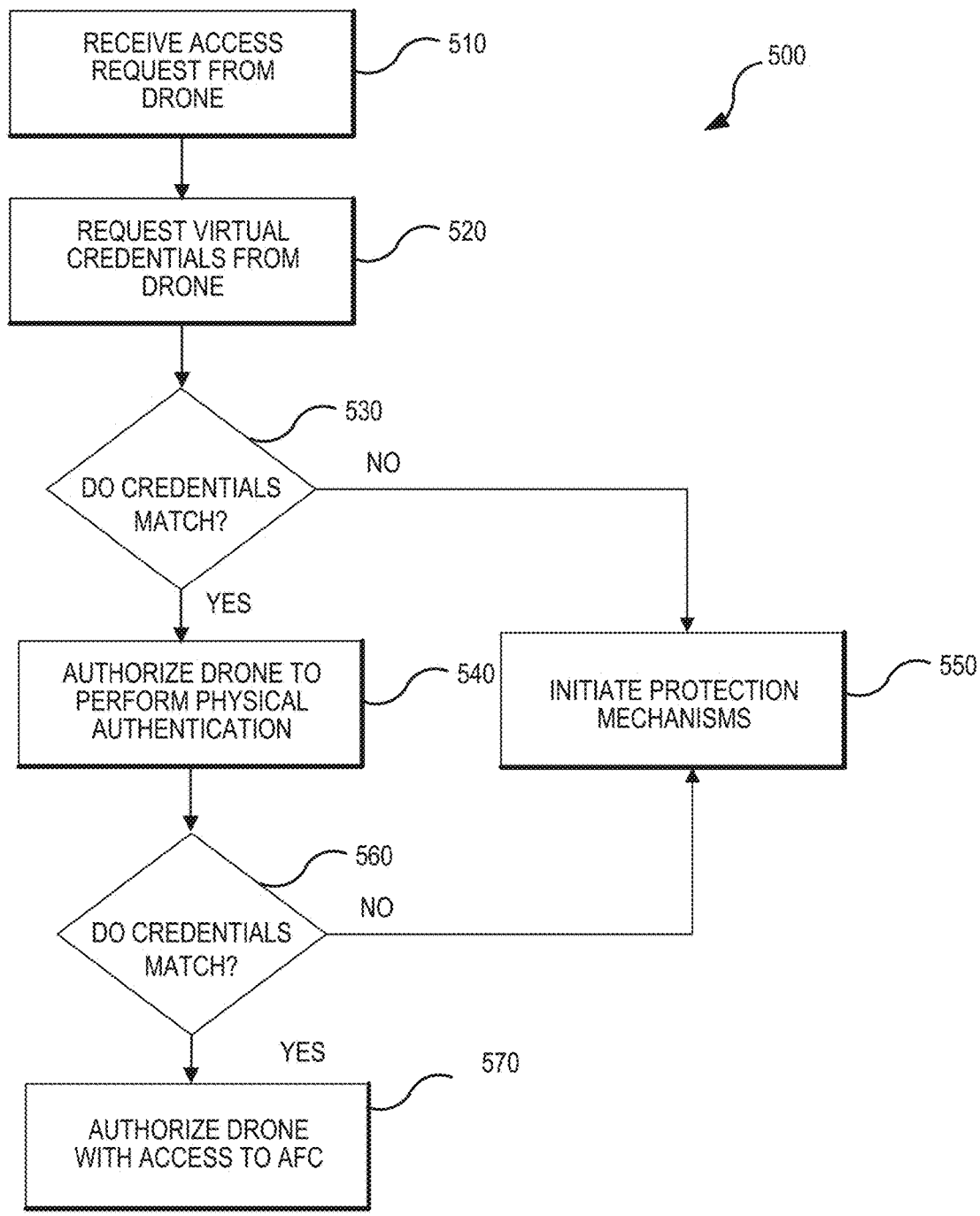
FIG. 5 is a flow diagram Illustrating a method for authorizing a drone with access to an airborne fulfillment center.

As described herein, the system 150 performs various processes or methods to authorize drones 120A-120N to access and/or approach the AFC 140. FIG. 5 is a flow diagram Illustrating a method 500 for authorizing a drone with access to the airborne fulfillment center 140. The method 500 may be performed by the drone authentication system 150, and, accordingly, is described herein merely by way of reference thereto. It will be appreciated that the method 500 may be performed on any suitable hardware.

In operation 510, the system 150 receives a request for access to the airborne fulfillment center by a drone located within a geographical region that includes the airborne fulfillment center. For example, the access request module 410 may receive a request from drone 120A to access the AFC 140 to pick up a package to deliver to a customer.

In operation 520, the system 150 sends a request to the drone for virtual access credentials associated with the drone, and, upon receiving the virtual access credentials from the drone, determines, in operation 530, whether the virtual access credentials match virtual access credentials stored in a database of the authorization system. For example, the virtual authentication module 420 may store or be associated with the credentials database 450 that stores, via various data structures, information identifying drones 120A-120N authorized to access one or more areas of the product fulfillment center, and compares the received virtual access credentials to the stored information.

When the virtual access credentials match access credentials stored in the database of the authorization system 150, the method proceeds to operation 540, and the system 150 sends a request to the drone to provide physical access credentials.

When the virtual access credentials do not match access credentials stored in the database of the authorization system, the method 500 proceeds to operation 550, and the system 150 initiates a protection mechanism to protect the airborne fulfillment center from a possible cyberattack or physical attack originating from the drone.

In operation 560, the system 150 determines whether the physical access credentials match a physical access verification device associated with the authorization system. For example, the physical authentication module 430 may determine that a certain configuration of pins extending from the probe 220 of the drone is coupled to an input component of the physical access verification device 210 and/or otherwise determine an occurrence of a form fits function coupling between the probe 220 of the drone and the input component of the physical access verification device 210.

When the physical access credentials match the physical access verification device, the method 500 proceeds to operation 570, and the system 150 authorizes the drone with access to the airborne fulfillment center. For example, the physical authentication module 430 may authorize access to a product delivery area of the product fulfillment center (e.g., to pick up or drop off packages or other items to be delivered), to a drone repair area of the product fulfillment center (e.g., to receive repairs, such as battery replacements, rotor replacements, general maintenance, and so on), to a drone recharging area of the product fulfillment center (e.g., to recharge the battery of the drone), and so on.

When the physical access credentials do not match the physical access verification device, the method 500 again proceeds to operation 550, and the system initiates a protection mechanism to protect the airborne fulfillment center from a possible cyberattack or physical attack originating from the drone. For example, the protection module 440 may initiate an operation to jam one or more signals of the drone, prevent communications between the drone and the product fulfillment center, or otherwise disrupt the communication capabilities of the drone. As another example, the protection module 440 may initiate an operation to physically attack the drone, to move the drone away from the product fulfillment center.

Therefore, in some embodiments, the drone authentication system 150 performs various authentication processes to protect the AFC 140, and/or its contents or data, including an authentication process that identifies a drone based on virtual credentials provided by the drone and/or an authentication process that identifies the drone based on physical credentials provided by the drone. By following the various processes, the AFC 140, via the system 150, may be protected from potentially harmful attacks originating from unknown drones, such as drones pretending to represent delivery drones known to the AFC 140, among other benefits.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in each specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method performed by an authorization system of an airborne fulfillment center (AFC) for providing a drone with access to the airborne fulfillment center, the method comprising:

receiving a request for access to the airborne fulfillment center by a drone located within a geographical region that includes the airborne fulfillment center;

sending a request to the drone for virtual access credentials associated with the drone;

upon receiving the virtual access credentials from the drone, determining whether the virtual access credentials match virtual access credentials stored in a database of the authorization system, wherein the database of the authorization system includes a data structure that relates drones known to the airborne fulfillment center with access credentials for the known drones;

if the virtual access credentials match access credentials stored in the database of the authorization system, sending a request to the drone to provide physical access credentials;

determining whether the physical access credentials match a physical access verification device associated with the authorization system based on determining whether a certain configuration of pins extending from a probe of the drone couples to an input component of the physical access verification device; and if the physical access credentials match the physical access verification device, authorizing the drone with access to the airborne fulfillment center.

2. The method of claim 1, further comprising:
if the virtual access credentials do not match access credentials stored in the database of the authorization system, initiating a protection mechanism to protect the airborne fulfillment center from a possible cyberattack or physical attack originating from the drone.

3. The method of claim 1, further comprising:
if the physical access credentials do not match the physical access verification device, initiating a protection mechanism to protect the airborne fulfillment center from a possible cyberattack or physical attack originating from the drone.

4. The method of claim 1, wherein authorizing the drone with access to the airborne fulfillment center includes authorizing the drone with access to a product delivery area of the airborne fulfillment center.

5. The method of claim 1, wherein authorizing the drone with access to the airborne fulfillment center includes authorizing the drone with access to a drone repair area of the airborne fulfillment center.

6. The method of claim 1, wherein authorizing the drone with access to the airborne fulfillment center includes authorizing the drone with access to a drone recharging area of the airborne fulfillment center.

7. The method of claim 1, wherein sending a request to the drone to provide physical access credentials includes generating a set of physical access credentials to be provided by the drone after receiving the virtual access credentials from the drone.

8. An authorization system for a product fulfillment center, the system comprising:

an access request module that receives a request for access to the product fulfillment center by a drone located at a geographical region that includes the product fulfillment center;

a virtual authentication module that:

sends a request to the drone for virtual access credentials associated with the drone; and upon receiving the virtual access credentials from the drone, determines whether the virtual access credentials match virtual access credentials stored in a database of the authorization system, wherein the database of the authorization system includes a data structure that relates drones known to the product fulfillment center with access credentials for the known drones;
a physical authentication module that:
when the virtual access credentials match access credentials stored in the database of the authorization system, sends a request to the drone to provide physical access credentials;
determines whether the physical access credentials match a physical access verification device associated with the authorization system; and
when the physical access credentials match the physical access verification device, authorizes the drone with access to the product fulfillment center; and
a protection module that, when the virtual access credentials do not match access credentials stored in the database of the authorization system, initiates a protection mechanism to protect the product fulfillment center from a possible cyberattack or physical attack originating from the drone,
wherein the protection mechanism includes physically attacking the drone to cause the drone to move the drone away from the product fulfillment center.

9. The system of claim 8, wherein the protection mechanism includes jamming one or more signals of the drone or preventing communications between the drone and the product fulfillment center.

10. The system of claim 8, wherein the physical authentication module determines that a certain configuration of pins extending from a probe of the drone is coupled to an input component of the physical access verification device.

11. The system of claim 8, wherein the physical authentication module authorizes the drone with access to a product delivery area of the product fulfillment center.

12. The system of claim 8, wherein the physical authentication module authorizes the drone with access to a drone repair area of the product fulfillment center.

13. The system of claim 8, wherein the physical authentication module authorizes the drone with access to a drone recharging area of the product fulfillment center.

14. The system of claim 8, wherein the product fulfillment center is an airborne vehicle that floats above the geographical region.

15. The system of claim 8, wherein the product fulfillment center is a ground-based facility within the geographical region.

16. A non-transitory computer-readable medium whose contents, when executed by an access authorization system associated with a facility that provides packages for delivery to customers by drones, cause the access authorization system to perform a method for authenticating a drone to the facility, the method comprising:
performing a first authentication process that identifies a drone based on virtual credentials provided by the drone;
performing a second authentication process that identifies the drone based on physical credentials provided by the drone,
wherein the second authentication process includes a determination that a certain configuration of pins extending from a probe of the drone is coupled to an input component of the facility; and
determining the drone is authorized to the access the facility based on the identification of the drone via the virtual credentials and the physical credentials provided by the drone.

* * * * *